United States Patent
Lloyd et al.

(10) Patent No.: US 6,298,289 B1
(45) Date of Patent: Oct. 2, 2001

(54) INTEGRATED SPACECRAFT CONTROL SYSTEM AND METHOD

(75) Inventors: David W. Lloyd, Manhattan Beach; Bret M. Botzong, Rancho Palos Verdes, both of CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/298,542

(22) Filed: Apr. 24, 1999

(51) Int. Cl.$^7$ .................................................. B64G 1/00
(52) U.S. Cl. .................................... 701/13; 244/158 R
(58) Field of Search ...................... 701/13; 244/158 R, 244/164, 165, 166, 167, 168, 169, 170, 171, 172, 173; 342/352, 355, 357.06, 357.11, 357.12; 714/25, 30, 48, 31

(56) References Cited

U.S. PATENT DOCUMENTS

| | | | |
|---|---|---|---|
| 4,634,110 | * 1/1987 | Julich et al. | 714/11 |
| 4,654,846 | * 3/1987 | Goodwin et al. | 714/13 |
| 5,152,482 | * 10/1992 | Perkins et al. | 244/158 R |
| 5,485,383 | * 1/1996 | Schreiber | 701/13 |
| 5,502,812 | * 3/1996 | Leyre et al. | 714/10 |
| 5,779,195 | * 7/1998 | Basuthakur et al. | 244/161 |
| 5,781,456 | * 7/1998 | Dodd | 702/123 |
| 5,839,696 | * 11/1998 | Caplin et al. | 244/159 |
| 5,873,285 | * 2/1999 | Barnes | 74/572 |
| 5,878,051 | * 3/1999 | Sharma et al. | 714/724 |
| 5,950,965 | * 9/1999 | Epstein et al. | 244/158 R |
| 5,961,076 | * 10/1999 | Eller et al. | 244/158 R |
| 6,018,315 | * 1/2000 | Ince et al. | 342/357.11 |

OTHER PUBLICATIONS

Ruffa et al., "MIDEX Advanced Modular and Distributed Spacecraft Avionics Architecture", Aerospace Conference 1998 IEEE, Mar. 1998, vol. 5, pp. 531–541.*

Price et al., "X2000 Flight Missions Utilizing Common Modular Components", Aerospace Conference 1998 IEEE, Mar. 1998, vol. 2, pp. 369–381.*

* cited by examiner

Primary Examiner—Michael J. Zanelli
Assistant Examiner—Eric M. Gibson
(74) Attorney, Agent, or Firm—Terje Gudmestad

(57) ABSTRACT

A spacecraft control electronics system provides multi-functionality to a spacecraft in a single electronics box. The system is subdivided into a plurality of modular electronic subunits. Each of the modular subunits plugs into a backplane in the electronics box and is positioned side-by-side. A serial data bus in the backplane of the box interconnects the modular subunits to each other. The data bus provides fully redundant, standard interfacing for the modular subunits. The plurality of electronic subunits provides spacecraft attitude determination, control, telemetry and command and data processing functions to the spacecraft as one unit. The electronics box connects to the spacecraft harness via external connectors. The spacecraft has a minimum number of harness connections as a result of the integrated functions in the spacecraft control electronics system. The control system applies selective internal redundancy in its subunits. The CPU subunit has triple mode redundancy through three microprocessors that are voted together to detect and correct errors due to single event upsets. The T&C/GPS subunit has an embedded GPS receiver that performs attitude determination as well as orbital positioning. The modular subunits have a built in self-test that verifies minute circuitry interconnections and detects faults automatically. The subunits are tested as stand-alone subunits, as a part of the spacecraft control electronics system, and/or as part of the spacecraft level integration using this automated built-in self test capability. Faults in the subunits or the system are detected in seconds. The built in self-test feature also provides an end-to-end spacecraft harness verification automatically in minutes. Defective modular subunits are removed and replaced with substitute modular subunits during spacecraft level integration.

27 Claims, 10 Drawing Sheets

TYPICAL TEST FLOW

IMPROVED TEST FLOW WITH SCE

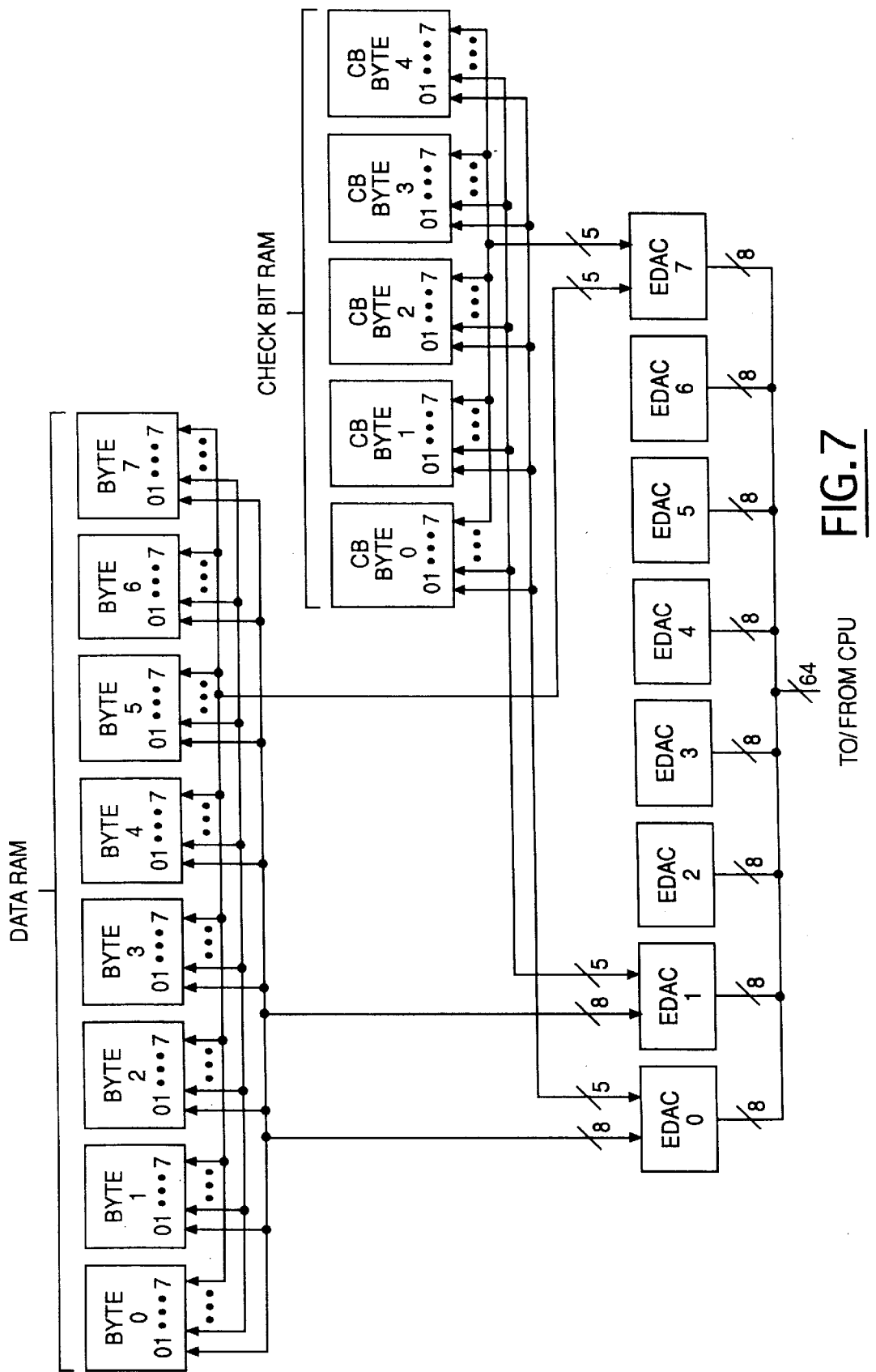

(AFT)

(FORWARD)

INTEGRATED SPACECRAFT CONTROL SYSTEM AND METHOD

TECHNICAL FIELD

This invention relates to spacecraft telemetry, command and control architecture and more specifically, to a system that has spacecraft attitude determination, control, telemetry and command functions and data processing functions integrated into a single control electronics unit.

BACKGROUND OF THE INVENTION

Traditionally, spacecraft customers order one or two spacecraft at a time from a spacecraft manufacturer for its business venture because of the cost associated with the purchase and launch of the spacecraft. A spacecraft manufacturer may have two to four spacecraft designs in its portfolio, from which the customer typically picks. The manufacturer will customize the payload and antennas to fit the customer's needs, thus leveraging the economies possible with a standardized manufacturing process while maintaining flexibility in design. Spacecraft manufacturers typically need from 15 months to 2 years to build a standard spacecraft.

Every spacecraft has a payload section and a bus section. The payload section houses the transponder/repeaters and the antennas of the spacecraft. The bus section of the spacecraft is the structure that supports many of the functions needed to operate and control the spacecraft. Manufacturing of a spacecraft is organized into areas of specialization, such as structures, propulsion, power, telemetry and command, attitude control, thermal control, and solar array assembly hardware and electronics, and payload integration and test, antenna fabrication, spacecraft integration and test. As a spacecraft is constructed, it passes through each of these areas of specialization. The spacecraft undergoes final integration and test before shipment to the launch site. Specialized test equipment, alignment tools, and large rollover fixtures, which allow technicians to reposition the spacecraft for easy access, are featured in the area of final integration.

With as many as seven specialization areas to be completed sequentially during the manufacture of the bus section of the spacecraft, the manufacturing process itself is time consuming and complex. It would be nice if the manufacturing process could be shortened. However, each of the functions carried by the bus section is necessary for spacecraft operation.

Much effort by the spacecraft manufacturer goes into research and development of new materials to make the bus section lighter weight, while maintaining its strength requirements. However, due to the small size of typical spacecraft orders, it had not been economically feasible for the spacecraft manufacturer to redesign the spacecraft bus to improve manufacturability. Much work has been done to continuously improve the existing manufacturing processes each year to stay competitive.

As in the manufacture of any product, the more of that product that you sell, the more feasible and desirable it becomes to streamline the manufacturing process and reduce production costs and risk. The same is true in the spacecraft manufacturing business. Satellite communications have become such an intricate part of society that more and more satellites are being purchased each year. The spacecraft manufacturers are realizing backlogs in the manufacture of spacecraft as much as 5 to maybe 10 years.

A more recent trend is the large volume orders of identical spacecraft for satellite constellations to support mobile telephone services, paging, faxing, videoconferencing, broadband multimedia and remote monitoring and tracking around the world. Motorola has recently launched approximately 66 satellites for its Iridium program and is working on another large volume satellite constellation with Teledesic having over 200 satellites. The assignee to this application is manufacturing 12 satellites for ICO Global Communications for estimated launches starting in 1999 and has another constellation of 8 satellites in development for its SPACEWAY™ Program. Therefore there is a need to streamline the design and manufacture of these satellites to reduce manufacturing time and cost and to maintain reliability to meet the competitive and ambitious schedules of the customer.

Thus, it would be advantageous to have a low cost, lightweight spacecraft telemetry, command and control architecture which integrates into a single electronic system many functions that previously have been implemented as physically separate systems on the spacecraft.

SUMMARY OF THE INVENTION

The present invention provides a system that integrates multiple functions, such as spacecraft attitude determination, control, telemetry and command and data processing functions in a highly efficient single internally redundant electronic system or unit, namely the spacecraft control electronics (SCE). The multi-functional SCE system has a plurality of electronic subsystems or subunits that all plug into a single housing or card cage and electrically interconnect to a serial data bus included in the backplane of the housing. The plurality of electronic subunits provide spacecraft attitude determination, control, telemetry and command and data processing functions to the spacecraft in the single housing. In the preferred embodiment, the subunits are modular printed wiring board subassemblies and the serial data bus is an industry standard interface. Moreover, in the preferred embodiment, the integrated SCE has selectively applied internal redundancy and the backplane serial data bus is redundant. Selective application of redundancy within the SCE, together with the redundant back plane serial data bus, allows full cross-strapping between all SCE subunits to optimized reliability while minimizing interface complexity and cost.

One of the plurality of subunits is a Telemetry and Command subunit for communicating with spacecraft transponders and antennas. A second of the plurality of subunits is a Wheel Drive subunit for communicating with spacecraft reaction wheels. Moreover, there is an Actuator subunit that communicates with spacecraft motors, thrusters and deployment mechanisms. Lastly, there is a Central Processing subunit for processing data between all the subunits and the spacecraft. In a preferred embodiment, the Central Processing subunit includes a high-throughput, commercial processor, comprising three microprocessors voted together on a single multi-chip module. Multiple functions can be consolidated into the high-throughput processor. This allows use of simple, low cost sensors and actuators, which contain few or no electronic elements themselves.

In a preferred embodiment of the SCE, each of the subunits has an automatic built-in self-test (BIST) feature for automatically testing all internal circuitry and external interfaces. Additionally, the SCE BIST provides an end-to-end spacecraft harness verification automatically. The BIST features, along with a modular packaging approach, greatly reduce production cycle time and cost from the circuit card level through spacecraft level integration. BIST allows each modular subunit for the integrated SCE system to be delivered directly to spacecraft-level integration, thereby bypassing the typical unit-level test program. In the event of a failure, the modular subunits can be quickly removed, replaced and re-verified at the spacecraft level in a fully automated fashion using the BIST features of the present invention.

The present invention further provides a spacecraft having a minimum number of spacecraft harness connections. The spacecraft of the present invention includes a bus section and a payload section, as in conventional spacecraft. However, the spacecraft of the present invention further comprises a multi-functional spacecraft control electronics unit on the bus section that communications with the payload section and the spacecraft hardware. The spacecraft control electronics unit includes a plurality of control electronics subunits that plug into a single housing that has a serial data bus in a housing backplane and external interfaces from the housing to the spacecraft. The subunits provide spacecraft attitude determination, control, telemetry and command and data processing functions to the spacecraft from the single housing. The single housing has a minimum of external interfaces to be connected to the spacecraft harness. In a preferred embodiment of the spacecraft, the integrated SCE has the same card cage design, size and shape as the processor cage frame in the payload section to reduce risk and cost and to increase commonality of mechanical design and manufacturing tooling.

As a result of integrating multiple functions into a single unit, hardware costs are reduced dramatically, as well as manufacturing time, since the conventional number of specialization areas of spacecraft manufacture are reduced. The overhead cost for separate spacecraft control functions is also dramatically reduced. Moreover, costly external interfaces are minimized.

The integrated SCE system in accordance with the present invention is partitioned into subunits or modules to provide flexibility to the spacecraft manufacturer in the design, manufacture and test of spacecraft. The physical partitioning of the integrated SCE system allows the modular subunits to be easily specified and dual or multiple-sourced, minimizing both development and production risk.

The present invention dramatically reduces the recurring cost of satellite control hardware, and reduces spacecraft bus integration and test time and cost. The features and advantages of the present invention are particularly suitable for large volume satellite constellation systems, where schedule and cost are key. Large volume satellite constellation systems are currently popular in low Earth orbit (LEO) and medium Earth orbit (MEO) applications, such as Iridium Program for Motorola and the ICO Global Communications, respectively. The present invention is also suitable for satellite constellations in a geosynchronous orbit (GEO) which is defined as 22,300 miles above Earth. The new satellite constellation called SPACEWAY™ being developed by the assignee of the present application will have 8 satellites destined for GEO.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 7 illustrates the architecture of the hamming code method in accordance with the preferred embodiment.

DETAILED DESCRIPTION OF THE INVENTION

Figure 1B:
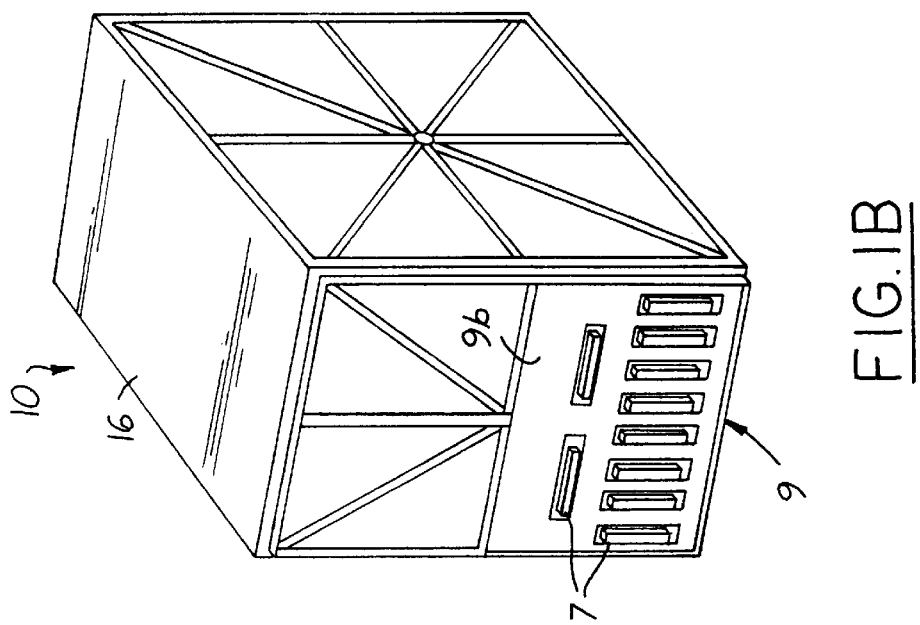
FIGS. 1B and 1C illustrate perspective rear and internal views, respectively, of the integrated SCE in FIG. 1A.
Figure 1A:
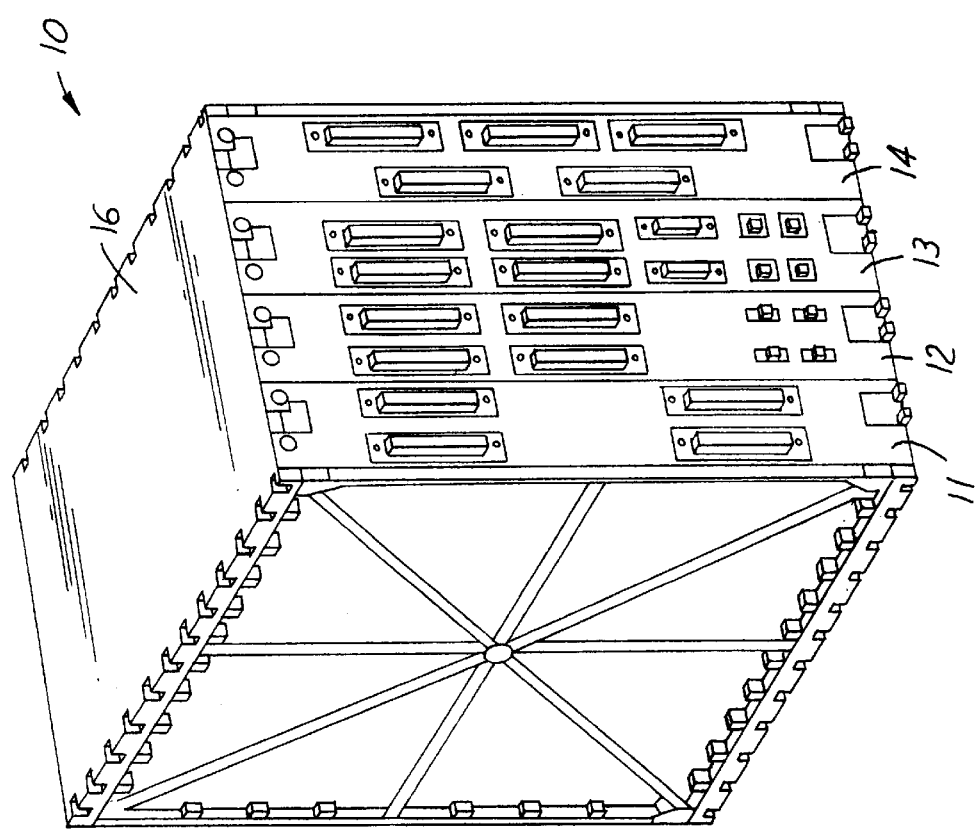
FIG. 1A illustrates a perspective view of the integrated SCE in accordance with the present invention.

The integrated SCE system 10 of the present invention is illustrated in FIG. 1A. The SCE system 10 is an internally redundant system which is physically partitioned into a plurality of subunits that together provide attitude control determination, telemetry, command and control and data processing functions to a spacecraft 60 (illustrated in FIG. 5). In the preferred embodiment illustrated in FIG. 1A, there are four plug-in style modular subunits, the Wheel Drive subunit 11, the CPU and Control Input and Output (CPU) subunit 12, the Telemetry and Command and Global Positioning System (T&C/GPS) subunit 13, and the Actuator subunit 14.

Figure 1C:
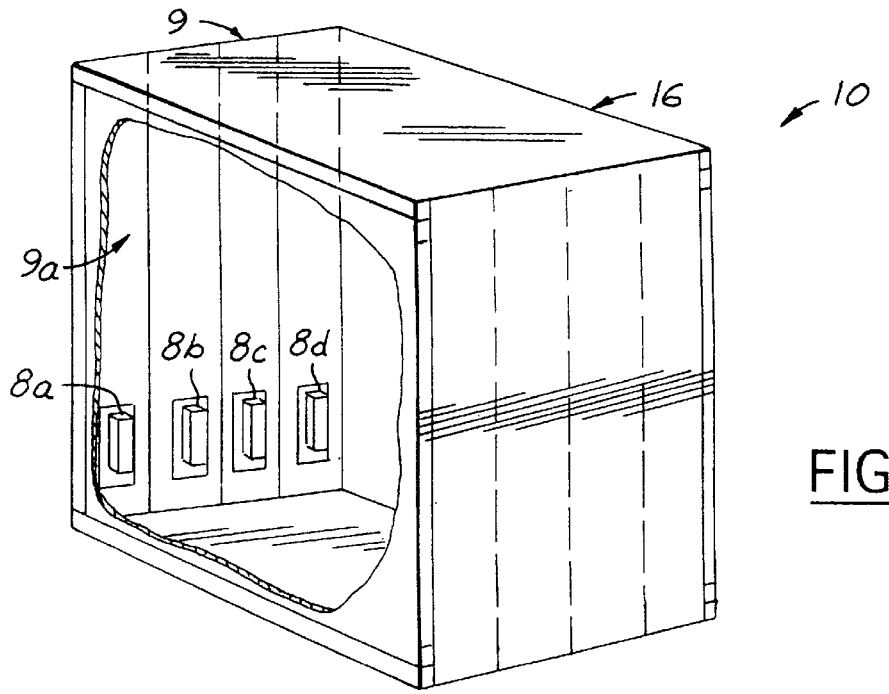

Each subunit 11–14 includes circuitry printed on a printed wiring board that is mounted to a rigid frame. In the preferred embodiment, at least two printed wiring boards (PWB), having circuitry thereon, are mounted back-to-back on a rigid aluminum web. One PWB within each subunit 11–14 contains the primary circuit functions, while the second PWB within the subunit contains identical redundant (backup) functions, providing highly reliable 2-for-1 redundancy. The subunits 11–14 plug into a rigid backplane 9 (illustrated in FIGS. 1B and 1C) supported by a housing or preferably, a card cage frame 16, that provides both high structural rigidity and excellent thermal conductivity to the integrated SCE system 10.

The backplane 9 is constructed using a single, rigid printed wiring board (PWB). The backplane 9 allows connectivity between subunits 11–14 within the SCE 10, and provides a signal routing path between each subunit and the rest of the spacecraft 60. A high density connector is attached to the rear of each subunit subunits 11–14, providing all the input/output signal connections required for the particular subunit subunits 11–14. When the subunit subunits 11–14 is properly engaged within the card cage 16, this connector mates to a corresponding connector 8a–8d on the interior side 9a of the backplane 9, illustrated in FIG. 1C, using a very low insertion force. Referring to FIG. 1B, connectors 7 are also mounted to the exterior 9b of the backplane 9 to allow the connection of spacecraft cabling to the SCE 10. There are eight vertically oriented and two horizontally oriented connectors 7 shown in FIG. 1B. The number and orientation of these exterior connectors 7 is illustrative only and the number and orientation may change depending on the requirements of the spacecraft 60. Since virtually all spacecraft input/output signals are routed through the backplane 9 to connectors 7 on the exterior 9b of the backplane 9, removal and/or replacement of individual subunits 11–14 does not require demating of any spacecraft cabling or connectors that are connected to external connectors 7. This reduces repair time and eliminates any risk of improperly mating or damaging spacecraft-level cabling.

Figure 4:
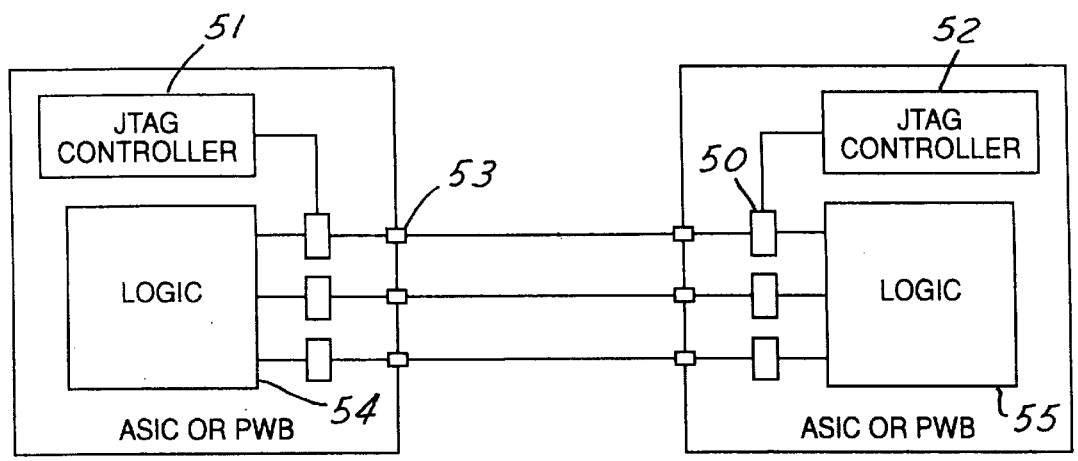
FIG. 4 illustrates a block diagram of the built-in self-test used in accordance with the present invention.

The SCE 10 has a unique built-in self-test (BIST) feature in accordance with the present invention. The integrated SCE 10 applies the industry-standard Joint Test Access Group (JTAG) built-in test methodologies of component testing to the next level, for example, to test circuits, subassemblies, systems and the spacecraft harness. The BIST feature tests at the printed wiring board (PWB) level, the application-specific integrated circuit (ASIC) level of each subunit using a full JTAG boundary scan implementation or technique, as described in U.S. patent application Ser. No. 09/235,708, filed Jan. 22, 1999, which is assigned to the assignee of the present application and incorporated herein by reference. Each subunit subunits 11–14 and the integrated SCE 10 have the BIST feature. FIG. 4 illustrates the JTAG test approach. In normal operation, JTAG nodes 50 are transparent. In a test mode, the JTAG controller 51, 52 takes over the control of the input/output pins 53. By forcing the I/O pins 53 to different logic states with logic 54, 55, connectivity faults can be detected. A complete "GO/NO-GO" workmanship test can be performed down to individually verifying every solder joint on a printed wiring board in each subunit subunits 11–14 automatically. Quite unexpectedly and advantageously, electrical failures can be pinpointed in seconds, reducing test time and cost and enabling guess-free rework.

The modular feature and the unique BIST feature, effectively makes each subunit subunits 11–14 a stand-alone unit. The modular feature of the subunits allows for each subunit to be easily specified and purchased from multiple sources to minimize development and production risks. The subunits are delivered directly to the spacecraft 60 for installation in the SCE 10 card cage 16. In the event of a failure during spacecraft testing, subunits can be easily removed, replaced, and reverified in a matter of minutes to provide added flexibility to the spacecraft manufacturing and spacecraft integration schedule.

At the spacecraft 60 level, the BIST feature tests the integrated SCE 10 backplane 9 and all external spacecraft interfaces (e.g., connectors 7) thereto using an extension of the JTAG boundary scan implementation that is described in U.S. patent application Ser. No. 09/235,708 for analog system level self test. The connectivity of the SCE 10 backplane 9 is verified and fault detection is made in seconds in a fully automated fashion. The spacecraft harness 64 is verified and fault detection is made in minutes in a fully automated fashion.

The SCE 10 is equipped with a "console-interface" (not shown), which is a high-speed serial connection remotely connected to a console device (not shown) monitored by a test technician that allows a test technician to communicate directly with the SCE 10, independently of the other dedicated SCE/spacecraft interfaces. The console device may be a small laptop personal computer, which can be remotely located many meters from the satellite under test. This small console computer can replace many large racks of test equipment currently used in a typical satellite test system. The technician simply commands the SCE 10 into test mode using the laptop, and then reads the results of the completed tests performed by the SCE 10.

In accordance with the present invention, the BIST features provide verification of the entire spacecraft power and signal harness 64 installation in a matter of seconds. The BIST feature unexpectedly and advantageously reduced initial spacecraft integration test time from many days to a matter of minutes. Moreover, the unique BIST feature greatly reduces production cycle time and minimizes the need for external special test equipment.

As mentioned above, each subunit subunits 11–14 plugs into a rigid backplane 9. The backplane 9 comprises a serial backplane data bus 15, preferably a redundant IEEE 1394 serial backplane data bus 15. The IEEE 1394 serial backplane data bus 15 is a high performance commercially available data bus which provides for a low cost, fully redundant, standard interfacing for the modular subunits. The integrated SCE system 10 of the present invention applies selective internal redundancy in its subunits subunits 11–14, which will be further described below with reference to the individual subunits. The backplane data bus 15 supports the selective redundant to provide full cross-strapping between all elements of the subunits 11–14 to optimize reliability while minimizing interface complexity and cost. Moreover, the integrated SCE 10 has a minimum number of easily specified interfaces between the subunits, which are also described below.

Figure 2:
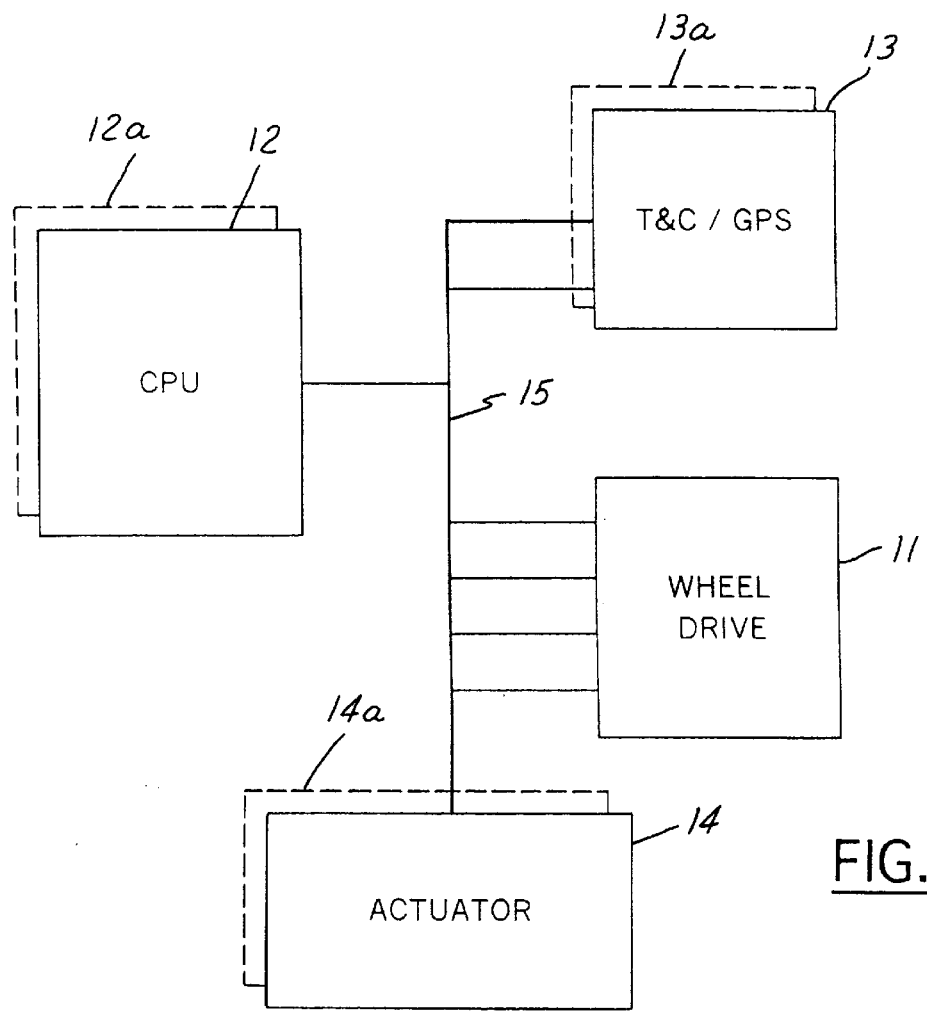
FIG. 2 illustrates a block diagram of the integrated SCE in accordance with one embodiment of the present invention
Figure 2A:
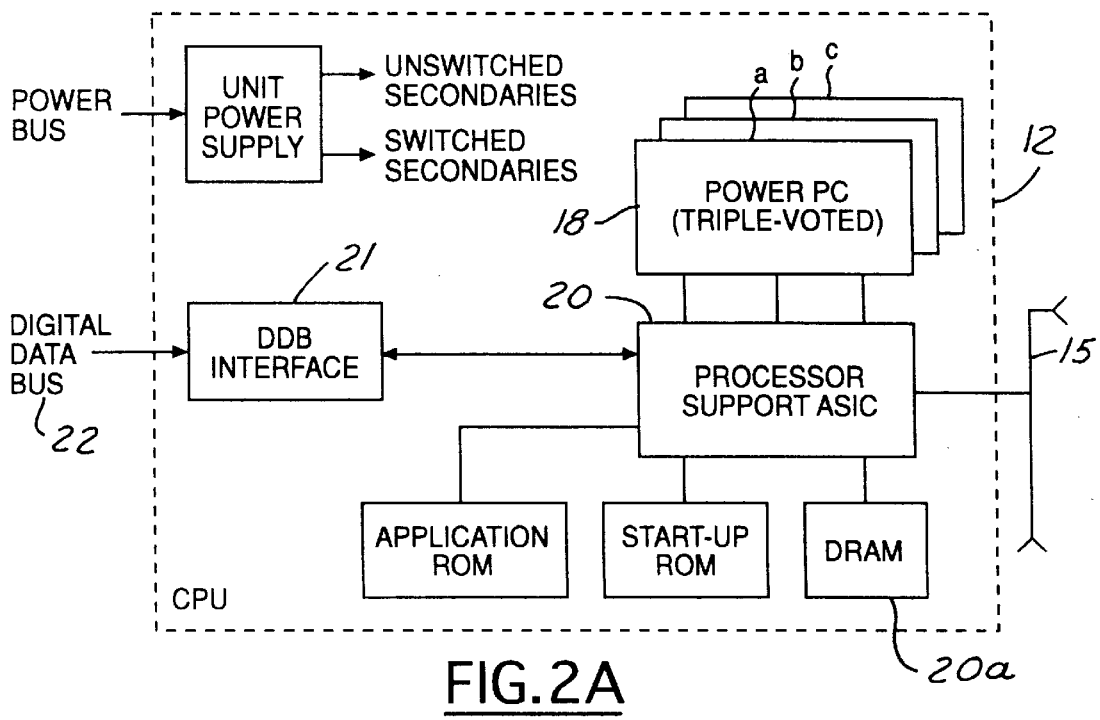
FIG. 2A illustrates a block diagram of the Central Processing Unit and Control Input/Output subunit of FIG. 2.
Figure 2B:
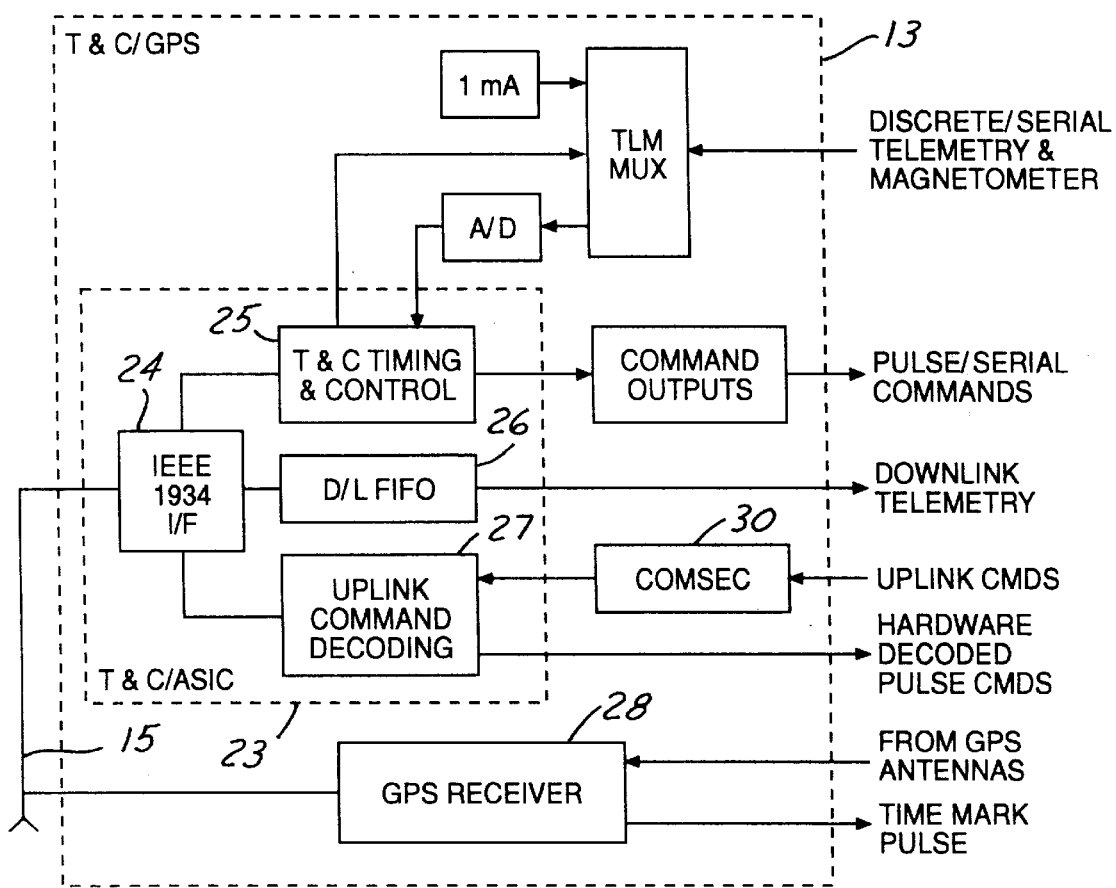
FIG. 2B illustrates a block diagram of the Telemetry and Command/Global Positioning System subunit of FIG. 2.
Figure 2C:
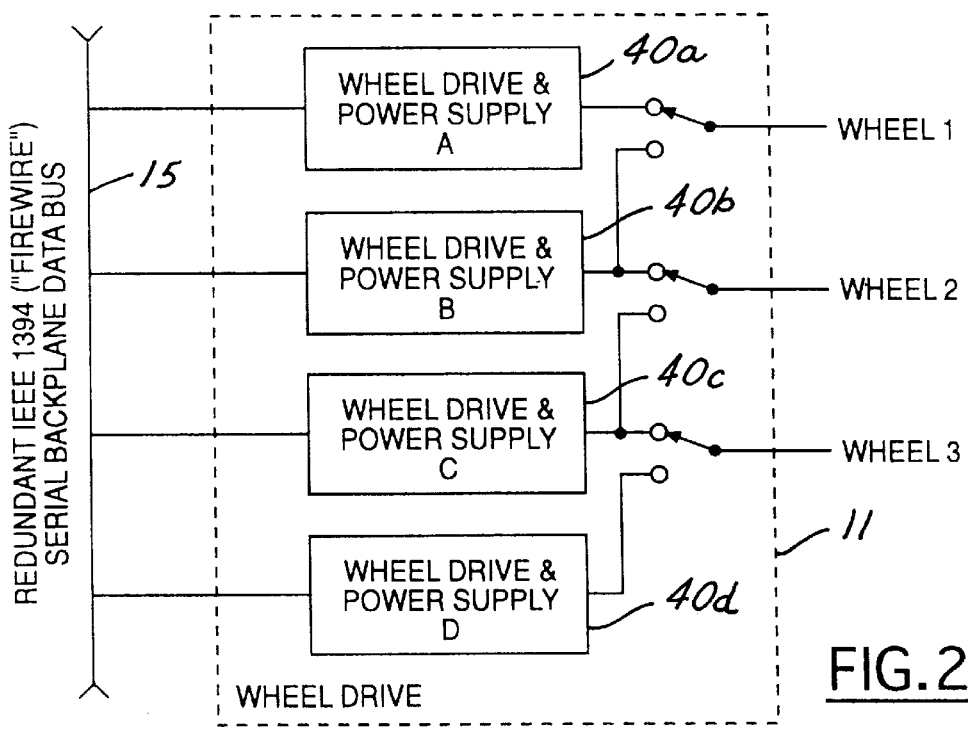
FIG. 2C illustrates a block diagram of the Wheel Drive subunit of FIG. 2.

FIG. 2 illustrates a block diagram of the integrated SCE system 10 of the present invention. In the preferred embodiment of the system 10, the CPU subunit 12, T&C/GPS subunit 13 and Actuator subunit 14 have redundant backup subunits 12a, 13a, and 14a, respectively, which are illustrated in FIG. 2. The redundant subunits 12a, 13a, and 14a of the preferred embodiment provide highly reliable 2-for-1 redundancy to the system 10. Further details of each subunit subunits 11–14 are illustrated in FIGS. 2A–2D. FIG. 2A illustrates the CPU and Control I/O subunit 12 (CPU subunit 12) of the integrated SCE system 10 of the present invention. FIG. 2B illustrates the Telemetry and Command/Global Positioning System subunit 13 of the integrated SCE system 10 of the present invention. FIG. 2C illustrates the Wheel Drive subunit 11 and FIG. 2C illustrates the Actuator subunit 14 of the present invention.

The CPU subunit 12 provides the data processing function in the integrated SCE 10. The CPU subunit 12 is based on a commercially available microprocessor, preferably the PowerPC™ 750 microprocessor 18. The PowerPC™ 750 microprocessor 18 is an advanced super scalar processor made by IBM that provides extremely high throughput and enables consolidation of many distributed processors into a central processor. In the preferred embodiment, the CPU subunit 12 comprises three PowerPC™ 750 microprocessors (18a, 18b, 18c, also referred to collectively as microprocessor 18) voted together to mitigate the effects of single-event upsets (SEUs) and further comprises a processor support application-specific integrated circuit (processor support ASIC 20) assembled together into a multi-chip module (MCM).

The advanced upper scalar high performance PowerPC™ 750 microprocessor 18 is the most recent upgrade to the PowerPC 603 family of microprocessors manufactured by IBM. The PowerPC™ 750 microprocessor 18 features a larger cache and wider data bus than earlier versions of the 603 microprocessor. These performance enhancements provide ample throughput for the integrated SCE 10 of the present invention, enabling streamlined, unconstrained software development and use of the latest vendor support tools. A cycle-for-cycle voter design at the microprocessor chip level is used to mitigate against microprocessor single bit error effects. The microprocessor 18 is radiation hardened to >60K rads and is latchup immune.

Figure 3:
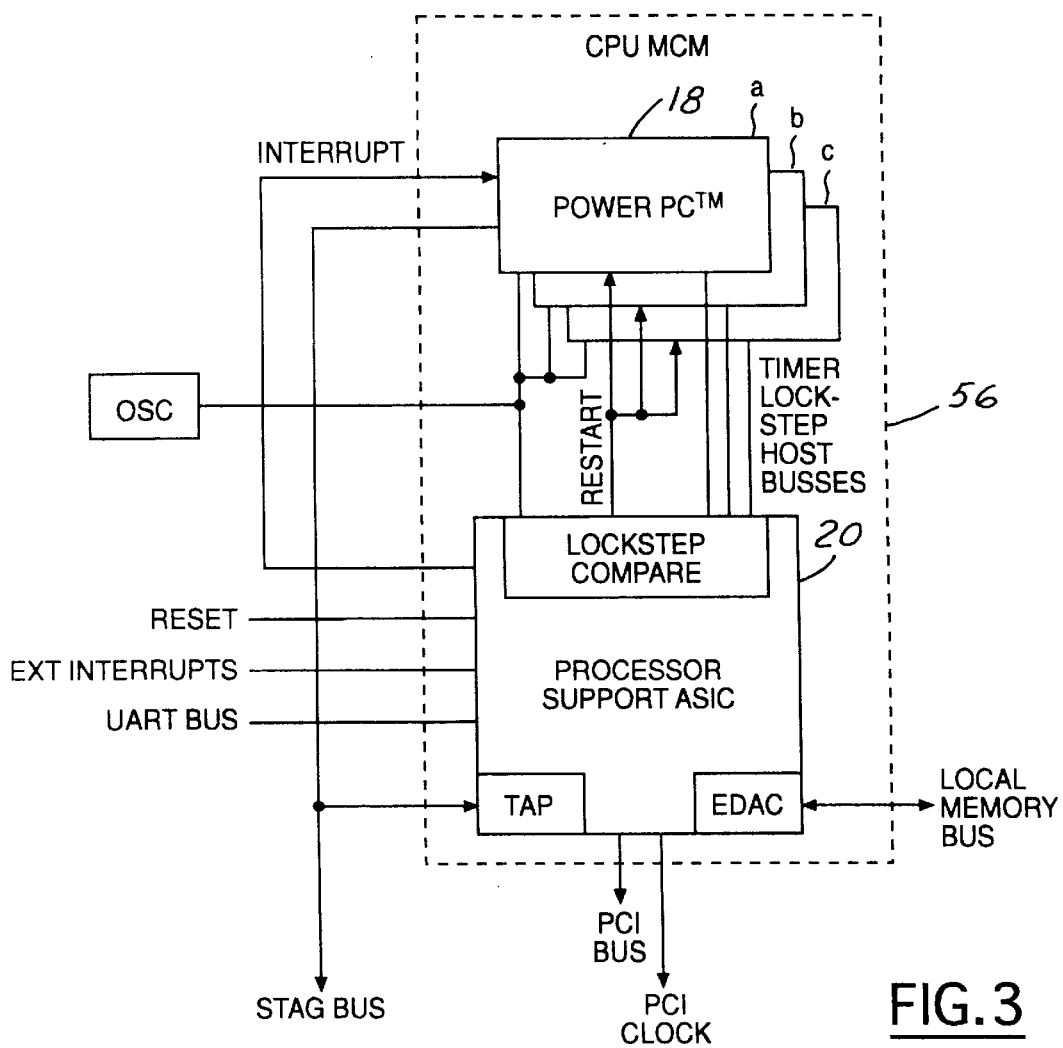
FIG. 3 illustrates a schematic of the SCE processor in accordance with one embodiment of the present invention.

The microprocessor 18 and processor support ASIC 20 MCM comprise the SCE processor 56 of the CPU subunit 12. FIG. 3 illustrates a schematic drawing of the SCE processor 56 of the CPU subunit 12. The SCE processor 56 comprises full test access to the BIST JTAG and Peripheral Component Interface (PCI) buses, the CPU subunit 12 and processor support ASIC 20. The processor 56 is rated 880 MIPS (Dhrystone 1.1) and 733 MIPS derated. It has Triple Mode Redundancy (TMR) lockstep processors for SEU and fault protection and provides Direct Memory Access (DMA) support. DMA is a method for allowing peripheral devices on the processor data bus to be granted direct access to the main processor memory. As mentioned above, one of the features of the invention is that the processors 18a–8c are voted together to detect and correct errors due to single-event upsets. If the instruction being executed by all three processors is not the same at any given time, the "majority" instruction is executed and the "minority" (upset) processor is corrected. It has a memory complement of up to 256 Mbytes of error detection and correction (EDAC) protected Synchronous Dynamic Random Access Memory (SDRAM) and a start-up bootstrap memory of 32 Kbytes PROM.

Figure 5:
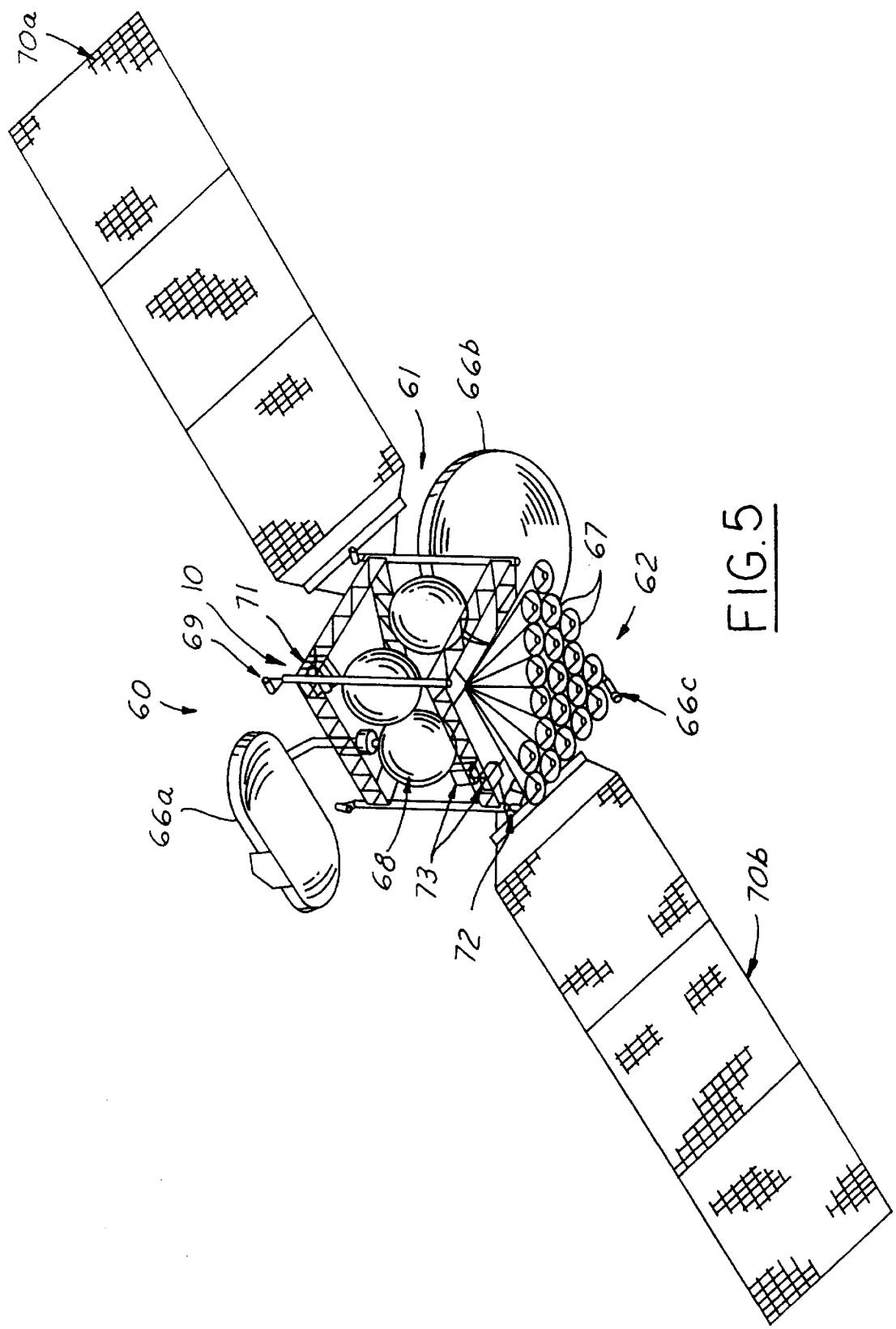
FIG. 5 illustrates a spacecraft that incorporates the integrated SCE of the present invention.

The PowerPC™ 750 microprocessor 18 is preferred for the present invention for its capabilities and because it is common with the payload 62 computer of the spacecraft 60 in FIG. 5. By selecting a common computer and operating system for the bus 61 and the payload 62 of the spacecraft 60, significant program risk and cost are avoided in application software development. Common development tools, reuse of application code, reuse of operating system code, and software maintainability can be realized across the entire space segment of the satellite program.

The processor support ASIC 20 performs lockstep fault detection, processor timing and configuration control, and memory and error detection and correction (EDAC) control. The ASIC 20 also includes a bus controller function, preferably an IEEE 1394 ("Firewire") bus controller function for compatibility with the preferred IEEE 1394 serial backplane data bus 15 and IEEE 1394 interfaces 24 and 32, described below with reference to subunits 13 and 14. The processor support ASIC 20 also comprises a PCI interface and a digital data bus interface 21 to allow information transfer between the SCE 10 and the spacecraft payload 62 (shown in FIG. 5) via the Digital Data Bus (DDB 22). The DDB 22 may be either a MIL-STD-1553, AS1773, or IEEE 1394 data bus, depending on the throughput requirements. For the preferred embodiment, the DDB 22 used was a MIL-STD-1553B bus.

The Telemetry and Command/Global Positioning System subunit (T&C/GPS subunit 13) illustrated in FIG. 2B comprises a telemetry and command (T&C) ASIC 23 and a GPS receiver 28. The GPS receiver 28 interfaces with the integrated SCE 10 data bus 15 directly from the T&C/GPS subunit 13. The GPS receiver 28 is in communication with GPS antennas (not shown) of the spacecraft 60. The T&C ASIC 23 interfaces to the integrated SCE 10 Data Bus 15 via an IEEE 1394 Interface 24. The IEEE 1394 interface 24 is a low cost, high performance serial data bus capable of at least 27 Mbps operation. It acts as a fully redundant backplane data bus within the SCE 10, and is used to transfer information between the processor 56 of the CPU subunit 12 and the other subunits 11 and 14. The T&C ASIC 23 comprises a telemetry and command (T&C) timing and control function 25 which is in communication with the discrete and serial telemetry and magnetometer (not shown) and pulse/serial commands (not shown) of the spacecraft 60. The T&C ASIC 23 further comprises a downlink first-in-first-out (D/L FIFO) function 26 in communication with spacecraft downlink telemetry (not shown), and an uplink command decoding function 27 in communication with uplink commands and hardware decoded pulse commands (not shown) of the spacecraft 60.

Uplink commands from a backup telemetry and command (T&C) transponder (not shown) are received and preprocessed in the T&C ASIC 23 using the uplink command decoding function 27. These commands are available via the uplink path only and provide an extra degree of anomaly recovery capability. Other command messages are passed to the CPU subunit 12 via the backplane data bus 15 for further processing and distribution. Commands that are crosslinked to the payload 62 are also received by the CPU subunit 12 via the digital data bus 22.

Bus housekeeping telemetry is gathered by the T&C/GPS subunit 13, then passed to the CPU subunit 12 for formatting. The telemetry data are gathered by the telemetry multiplexer 25a and A/D converter 25b, which are both under the control of the T&C timing and control function 25 within the T&C ASIC 23. Payload telemetry is gathered directly by the CPU subunit 12 via the digital data bus 22. Composite formatted telemetry data are then passed back to the T&C subunit 13 for downlinking via the T&C transponder (not shown) of the spacecraft 60 or passed to the payload 62 via the digital data bus 22 for crosslinking.

A command security feature (COMSEC) 30 is preferably included in the T&C/GPS subunit 13. Uplink commands pass through the command feature 30 before being received by the uplink command decoding function 27. The integrated SCE 10 uses embedded Caribou command decryption/authentication to provide robust and highly reliable command security. COMSEC was developed by the assignee to the present invention and is an industry standard in satellite communications systems. The National Telecommunications Information Systems Security Policy (NTISSP) requires that satellites carrying U.S. Government traffic must have an National Security Agency (NSA)-approved secure command system. At the time of this invention, Caribou is the only NTISSP-compliant COMSEC algorithm approved by the NSA for commercial spacecraft.

Figure 2D:
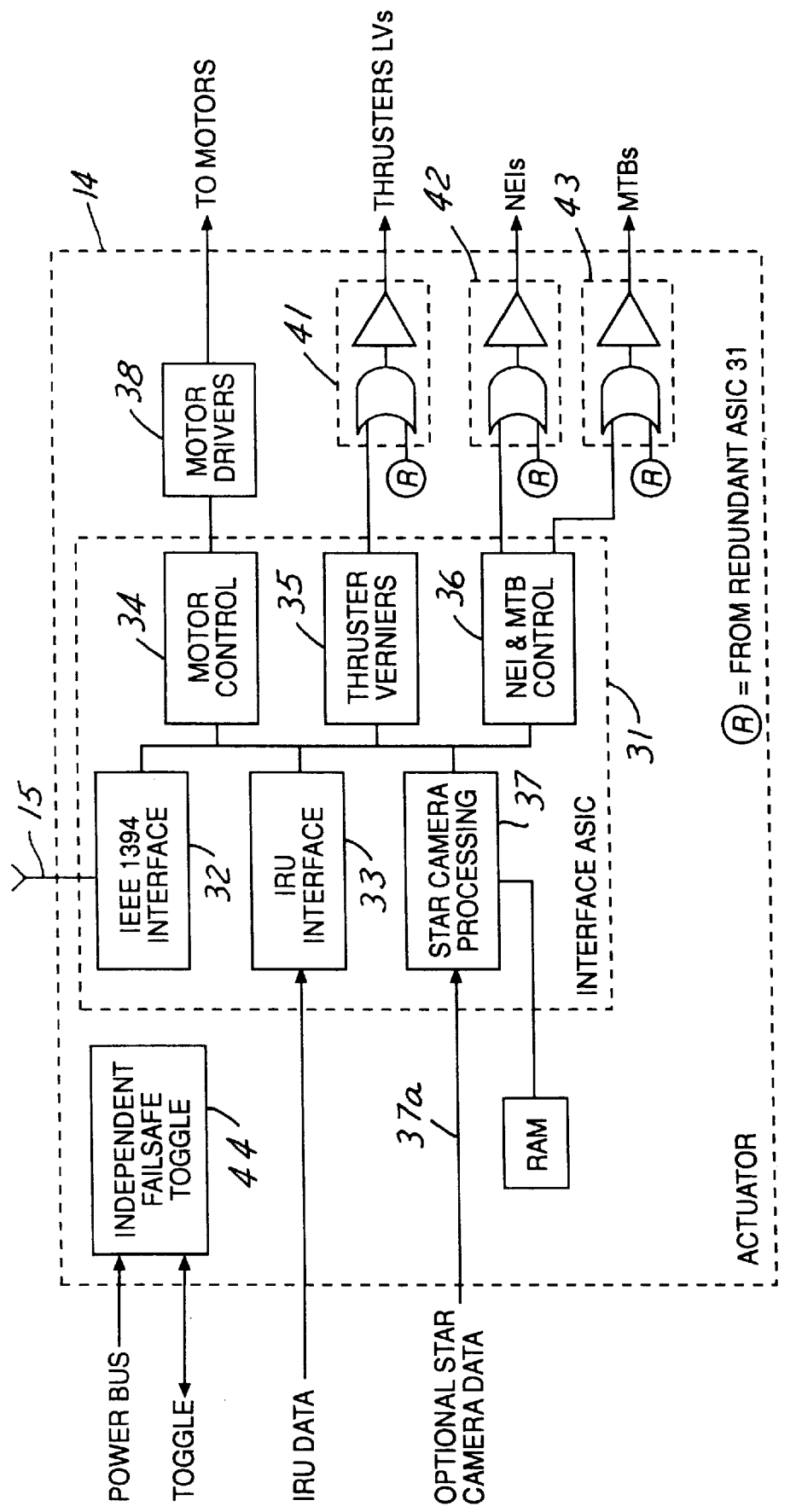
FIG. 2D illustrates a block diagram of the Actuator subunit of FIG. 2.

FIG. 2D illustrates the Actuator subunit 14. The Actuator subunit 14 comprises an Interface ASIC 31 that interconnects with the IEEE 1394 data bus 15 via an IEEE 1394 interface 32 for integration in the SCE system 10. Like IEEE 1394 interface 24, described above, the IEEE 1394 interface 32 is a low cost, high performance serial data bus capable of at least 27 Mbps operation. It acts as a fully redundant backplane data bus within the SCE 10, and is used to transfer information between the processor 56 of the CPU subunit 12 and the other subunits 11 and 13. The Interface ASIC 31 also comprises an inertial reference unit (IRU) interface 33, motor control function 34, thruster verniers 35, nonexplosive initiators (NEI) and magnetic torquer bar (MTB) control 36 and star camera processing function 37. The Interface ASIC 31 provides information to the spacecraft 60 motors (not shown) via the motor control function 34. The motor control function 34 communicates with stepper motor drivers 38 of the Actuator subunit 14. The two-axis solar wing position mechanism (not shown) of the spacecraft 60 is controlled by stepper motor drivers 38, with motor current feedback to allow precision microstepping.

The Interface ASIC 31 also provides information to the thrusters and latch valves (LVs) (not shown) of the spacecraft 60 via the thruster vernier function 35. Data from the thruster verniers 35 are processed through propulsion valve drivers 41 of the Actuator subunit 14 and provided to the spacecraft thrusters and LVs. The Interface ASIC 31 further provides information to the spacecraft NEIs and MTBs via the NEI & MTB control functions 36. Data from the NEI & MTB Control functions 36 is processed through NEI and MTB drivers 42, 43 in the Actuator subunit 14 and provided to the NEIs and MTBs (not shown) of the spacecraft 60, respectively.

The propulsion valve driver 41, magnetic torquer bar driver 43, and nonexplosive initiator driver 42 are preferably simple on/off field-effect transistor (FET) switches. In the preferred embodiment, there are two Interface ASICs 31 for selective redundancy to the SCE 10. The drivers 41, 42, 43 are nonredundant, but control of each driver is internally cross-strapped to both Interface ASICs 31 for increased reliability. Also, in the preferred embodiment, nonexplosive initiators are used for spacecraft level deployments instead of explosive squibs to simplify electrical design of the integrated SCE 10 of the present invention and minimize personnel safety issues.

The Wheel Drive subunit 11 is illustrated in FIG. 2C. The Wheel Drive subunit 11 comprises reaction wheel drivers, preferably four independent reaction wheel drivers 40a, 40b, 40c, 40d, each with a dedicated power supply. The four reaction wheel drivers 40a–40d drive the three reaction wheels (not shown) of the spacecraft 60 in a 4-for-3-redundancy configuration as shown in FIG. 2C, wherein each spacecraft reaction wheel is driven by two reaction wheel drivers (40a–40b, 40b–40c, 40c–40d). Each of the wheel drivers 40a–40d is internally cross-strapped to both primary and redundant processor PWBs within the CPU subunit 12 via the IEEE 1394. back plane data bus 15 for maximum reliability. The CPU subunit 12 sends simple digital torque commands to the wheel drivers 40a–40d and receives wheel speed feedback.

In accordance with the present invention, attitude control sensing and actuator processing is consolidated as much as possible within the SCE 10, allowing the use of simple, low cost sensor "heads" and "dumb" reaction wheels containing only a motor and speed sensor. The SCE 10 receives rate data from the spacecraft's IRU (not shown) via the Interface ASIC 31 of the Actuator subunit 14, which passed the data to the CPU subunit 12 via the IEEE 1394 backplane data bus 15.

In addition, the embedded GPS receiver 28 within the T&C/GPS subunit 13 provides carrier phase, pseudo-range data, orbit position/ephemeris, and GPS time data to the CPU subunit 12 via the backplane data bus 15. Phase measurements from four spacecraft GPS antennas (not shown) allow spacecraft attitude to be determined by the CPU subunit 12. In the preferred embodiment, the GPS receiver 28 also provides a precision 1 Hertz (Hz) time-mark pulse that can be used to precisely calibrate time code information distributed on the digital data bus 22 within 10 microseconds. The GPS receivers that are currently available are stand-alone units, which tend to be heavy and expensive. According to the invention, the GPS receiver 28 is embedded in the T&C/GPS subunit 13. Another key feature of the GPS receiver 28 is its ability to perform attitude determination, as opposed to just orbit position, as in the conventional GPS receivers. Attitude determination is performed in the GPS receiver 28 by using two (or more) widely spaced antennas and comparing the phase difference in the GPS receiver 28 GPS signal.

Although the GPS receiver 28 provides attitude determination capability, another embodiment of the integrated SCE system 10 of the present invention also includes a star camera interface 37a in the Actuator subunit 14 that would increase attitude determination accuracy. Raw pixel data from a star camera (not shown) on the spacecraft 60 is preprocessed in the interface ASIC 31 via its star camera processing function 37 before being passed to the CPU subunit 12 for further processing.

In accordance with the preferred embodiment of the present invention, several levels of fault tolerance are employed in the integrated SCE system 10. Extensive fault detection, isolation, and recovery (FDIR) software performs autonomous reconfiguration of spacecraft bus functions due to failures. Conventional FDIR software is used and is well known to those skilled in the art. Several hardware fault protection features are also included in the preferred integrated SCE 10. An independent fail-safe "toggle" circuit 44 included in the Actuator subunit 14 will cause a one-time, unidirectional switch from the primary to the backup (redundant) processing within the CPU subunit 12 if a hard failure is detected. The toggle circuit 44 is independently powered directly from the power bus (not shown) of the spacecraft 60. The fault protection feature is a conventional failsafe feature used on commercial spacecraft manufactured by the assignee of this application. In another embodiment, several other hardware timers may be provided, including a processor watchdog timer and thruster on-time accumulator (not shown).

The present invention employs Single Event Upset (SEU) mitigation features in the preferred embodiment. Table 1 identifies the SEU mitigation approaches that may be used in present invention. The large amount of storage in the CPU subunit 12 makes this subunit the largest contributor to SEU effects in the integrated SCE 10. To protect against SEUs in the PowerPC™ 750 microprocessor 18, the three microprocessors 18a, 18b, 18c are voted together, as mentioned above. The three microprocessors 18a–8c are operated in parallel, and outputs are compared cycle-by-cycle cycle. If a discrepancy is detected, the CPU subunit 12 can continue program execution for a period of time before initiating a resynchronization sequence. This process returns the microprocessors 18a–18c to an equal state before execution is resumed.

The memory is the next major contributor to SEU errors. The RAM from the DRAM portion 20a of the processor support ASIC 20 is protected with an extensive hamming code that can detect and correct errors of up to a byte in width within the same word. Conventional hamming codes to detect and correct errors are known in the art and will work in the present invention. However, in the preferred embodiment, a method of memory EDAC is used, which will correct all bit errors within a row address of the memory array in single physical device, and detect all bit errors within a row address of the memory array across two physical devices using simple single-bit error (SBE) correction and double-bit error (DBE) detection circuits. The method can also correct multiple bit errors in several physical memory devices as long as the corresponding error bit positions do not overlap.

The preferred hamming code method is particularly useful for systems that incorporate commercial, off-the-shelf, high reliability ICs into satellite electronics, as in the present invention. The method advantageously allows the use of industry standard, commercially available RAM in spaceborne processor applications, or any application, where the probability of memory data corruption up to an entire row address of the memory array within a physical device due to SEUs is high and unacceptable. Moreover, the hamming code method advantageously allows the use of inexpensive, commercially available, high-density memory devices that are not designed to be used in harsh space radiation particle environment. In spacecraft processor applications, where demand for greater and greater memory capacity has driven the cost of manufacturing up, this method will reduce the overall cost of manufacturing and increase the memory capability of the processors at the same time.

The hamming code method of the preferred embodiment interconnects an array of simple SBE correction and DBE detection circuits to memory devices in such a way that corresponding data bits from each physical device are grouped to a particular EDAC circuit. Then, SEUs that corrupt an entire row address of the memory array within a physical device can be treated as single bit errors being corrected by the EDAC array. Referring to FIG. 7, if corruption occurs to an entire row of data in byte 0, for example, EDAC 0 through EDAC 7 will correct each corrupted bit in byte 0. In other words, EDAC 0 will correct data bit 0 in byte 0, EDAC 1 will correct data bit 1 in byte 0, etc.

Also SEUs that corrupt an entire row address of the memory array across two physical devices within the same address can be flagged as double bit errors. For example, if corruption occurs to an entire row of data in byte 1 and byte 7 within the same address, EDAC 0 through 7 will all flag double bit errors.

In addition, bit errors in several physical devices at an address can also be corrected if the data bit error positions in one device is different from another. For example, at an address, if a bit error occurs in bit 0 of byte 2, and bit 1 of byte 3, and bit 5 and 7 of byte 5, EDAC 0, EDAC 1, EDAC 5 and EDAC 7, respectively, will correct all of these errors.

Figure 8:
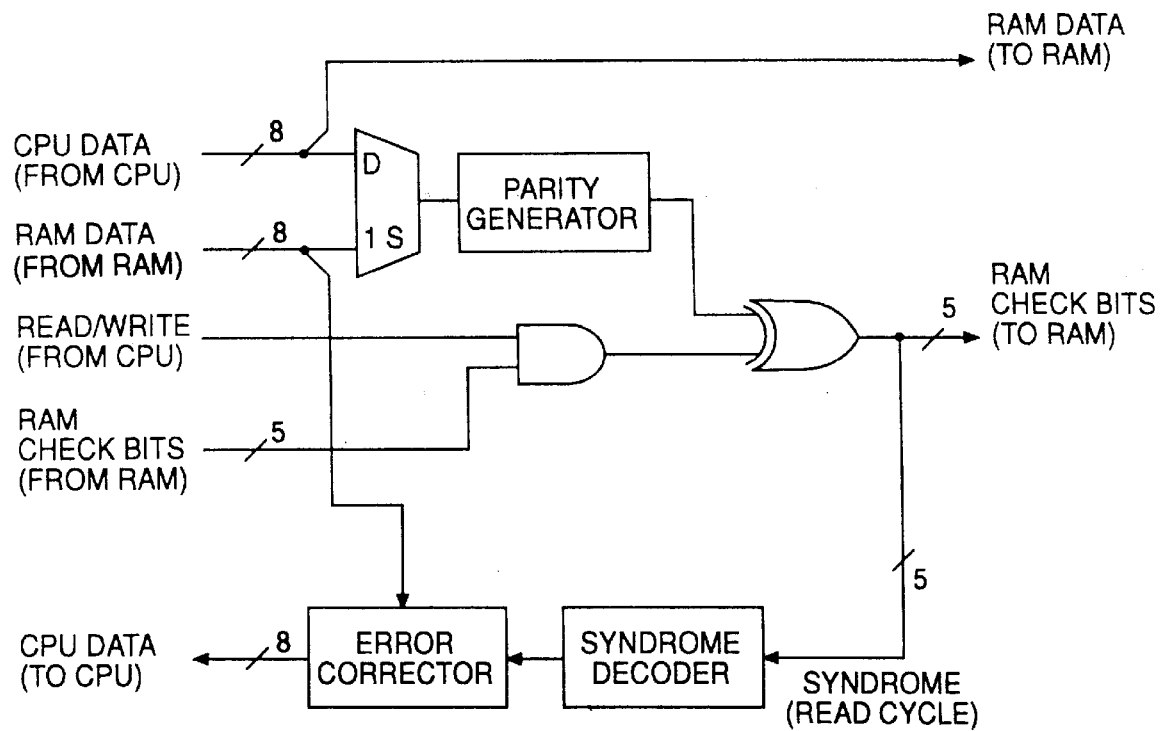
FIG. 8 illustrates a simple single-bit error (SBE) correcting and double-bit error (DBE) detecting logic in accordance with the preferred embodiment.

FIG. 7 illustrates the architecture of the hamming code method in accordance with the preferred embodiment. FIG. 8 illustrates a simple SBE correcting and DBE detecting logic. Correctable bit error locations can also be determined with this method.

The third largest contributor to SEUs is the processor support ASIC 20. Every critical register inside the processor support ASIC 20 uses the invention's triple vote/refresh scheme to protect against upsets. This robust system level feature of the present invention to SEU mitigation advantageously results in an overall nonself-correcting CPU SEU error rate of <1 every 500 years.

TABLE 1

Single Event Upset (SEU) Mitigation Approaches

| Level of SEU Mitigation | Approach |
| --- | --- |
| Component | All devices extensively characterized for SEU performance. All devices immune by design to SEU-induced latchup and gate rupture. Off-the-shelf devices and ASIC processes selected for very low upset rates, typically 1E-9 flips/bit-day. |
| Subunit | Dual lockstep processor configuration contains errors within CPU and allows normal operation to proceed without interruption. EDAC-protected RAM provides SEU-immune memory. Internal redundancy in uplink command processing ASIC provides immunity to SEU-induced spurious commands. |
| Unit/System | Digital data bus message protocol includes parity protection against single bit errors. System-level FDIR software designed to minimize interruptions due to SEUs. SEU effects considered in system-level failure modes and effects analysis. |

Figure 9A:
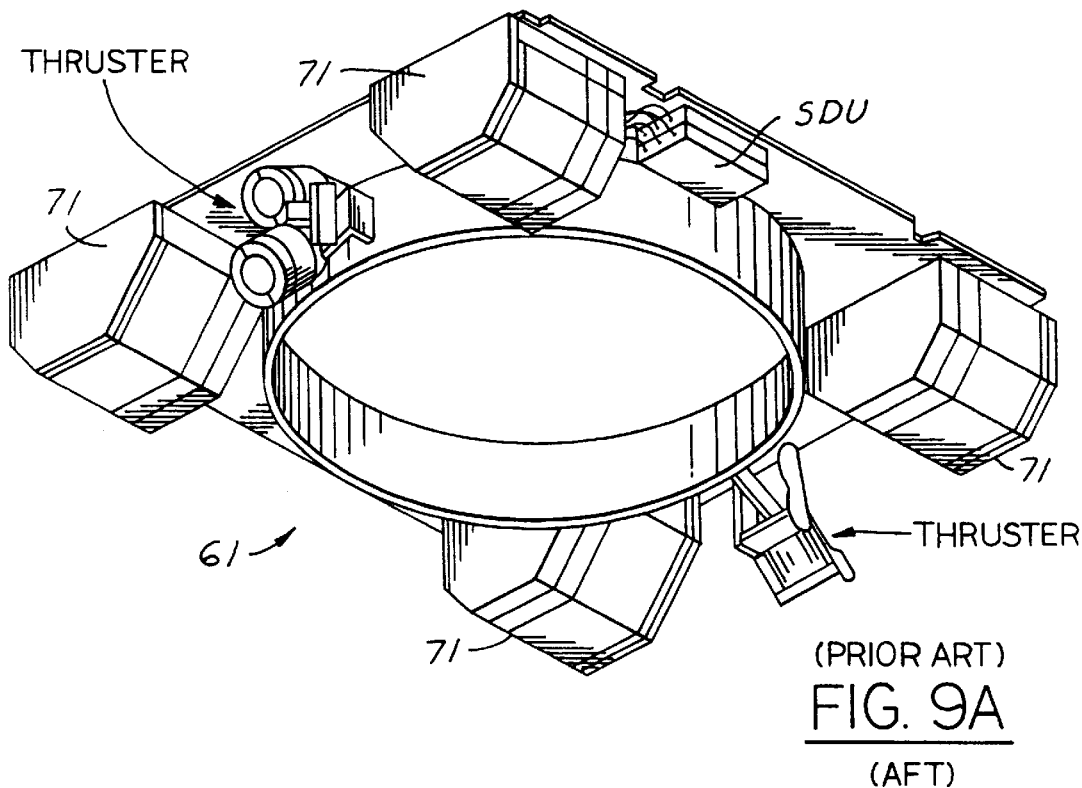
FIGS. 9A and 9B illustrate the aft and forward sides, respectively, of a conventional spacecraft bus module.
Figure 9B:
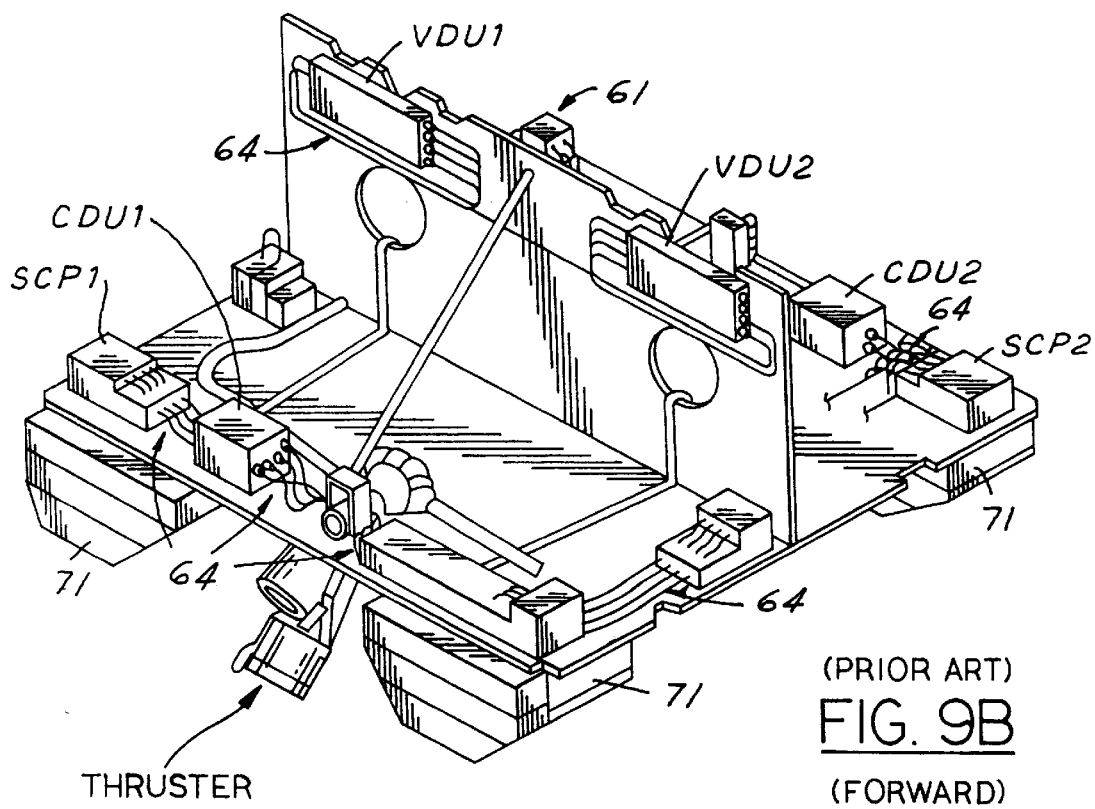

FIG. 5 illustrates a spacecraft 60 in accordance with the present invention. As with conventional spacecraft, spacecraft 60 has a bus section 61 and a payload section 62. Payload section 62 is generally indicated in FIG. 5 as that portion of the spacecraft 60 having the antennas 66, feed horns 67, sensor suite 72 and feed arrays 73. The bus section 61 is generally indicated in FIG. 5 as that portion of the spacecraft 60 having the propellant tanks 68, thrusters 69, solar array and wings 70a, 70b and battery packs 71, for example. In accordance with the invention, the integrated SCE 10 is located in the bus section 61, indicated generally as illustrated in FIG. 5. FIGS. 9A and 9B illustrate the aft and forward sides, respectively, of a conventional bus module 61 of the assignee of the present invention. The aft side faces into the spacecraft body and the forward side faces into space. The SCE 10 replaces individual units, such as the Squib Driver Unit (SDU), and the Spacecraft Control Processors (SCP 1, SCP 2), the Command Decoder Units (CDU 1, CDU 2), the Valve Driver Units (VDU 1, VDU 2) illustrated in FIGS. 9A and 9B, respectively. The SCE 10 further incorporates the electronics that are currently housed in the Momentum Wheel Assembly (MWA) (not shown). Therefore, at least the above-mentioned eight individual physical units, their functions and the associated wiring therefrom to the conventional state of the art spacecraft are consolidated into one integrated SCE 10 that is located approximately where the SCP 2 is located in FIG. 9B, in accordance with the preferred embodiment. Further, it should be readily apparent to those skilled in the art that the integrated SCE 10 and its consolidated external interfaces (connectors 7) significantly minimize the wiring and number of connections between the spacecraft wire harness 64.

Figure 6A:
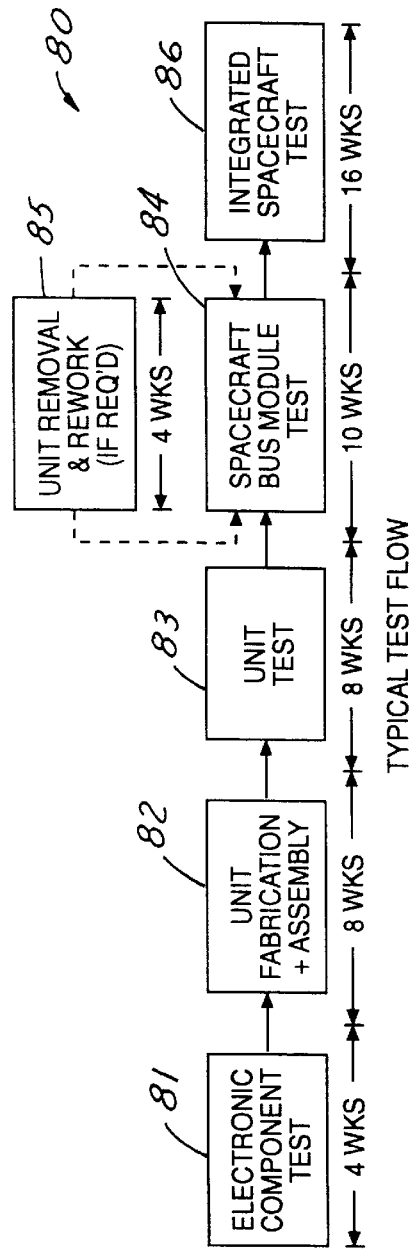
FIG. 6A illustrates a flow chart of the typical test flow during spacecraft integration.

As mentioned above, spacecraft integration is typically a complex and time consuming process requiring weeks or months of testing at different levels of satellite manufacture and integration. FIG. 6A illustrates a flow chart of a typical test flow during the manufacture and integration of a spacecraft. As illustrated in FIG. 6A, electronic component test (step 81) takes typically four weeks to complete. From component test 81, the electronic units are fabricated and assembled (step 82) with the electronic components that successfully passed the testing in step 81. The fabrication and assembly of the electronic units typically takes eight weeks to complete. The assembled electronic units are tested (step 83) at the unit level. Unit testing typically takes another eight weeks to complete. The electronic units that passed unit testing are integrated into a spacecraft bus module and tested (step 84). This integration and test step 84 typically takes ten weeks. If any electronic units fail the bus module integration tests, they are removed and reworked (step 85). If this step 85 is required, the removal and rework takes typically four weeks. The reworked units are then re-integrated into the spacecraft bus module and are re-tested (step 84). The spacecraft bus module is sent to spacecraft integration and tested (step 86). Integration and test 86 typically takes sixteen weeks to complete. All in all the manufacture and integration of spacecraft electronics into a spacecraft typically takes 46 to 52 weeks.

Figure 6B:
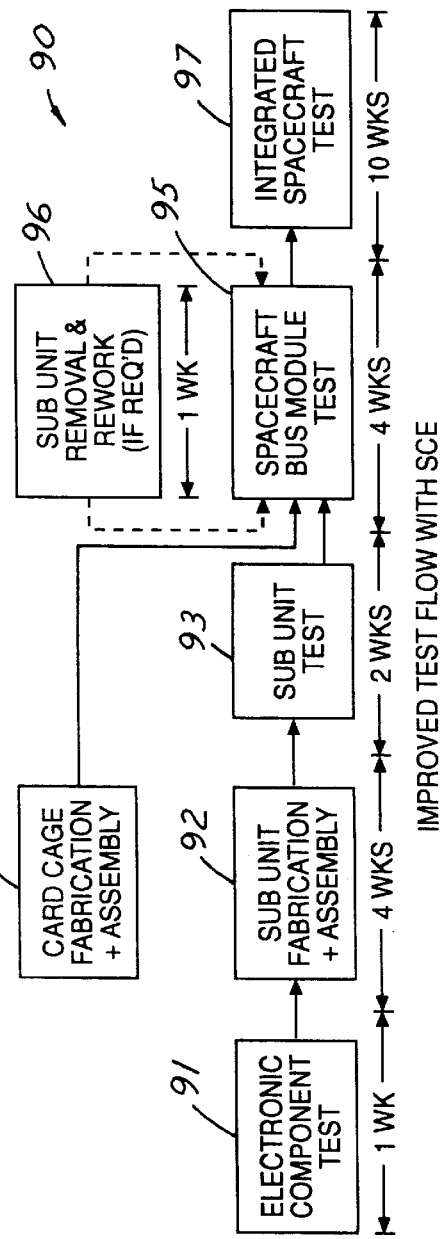
FIG. 6B illustrates a flow chart of the test flow during spacecraft integration in accordance with the present invention.

FIG. 6B illustrates a flow chart of the test flow during the manufacture of a spacecraft 60, which implements the present invention. The step of electronic component test 91 takes as little as one week. The shortened time period for testing at step 91 is a result of integration and consolidation of electronic functions and electronic components in the SCE 10. The subunits 11–14 of the present invention are fabricated and assembled at step 92. The subunit subunits 11–14 fabrication and assembly takes only four weeks, due to the modularity of the subunit designs. The modular subunits 11–14 are then tested at step 93, a process that takes only two weeks, due to the internal BIST test features described above. The card cage 16 is fabricated and assembled and the subunits 11–14 are connected together in the card cage 16 via backplane 9 to form the SCE system 10 of the present invention. The SCE 10 undergoes spacecraft bus module test (step 95), the entire fabrication, assembly and test processes taking only four weeks, again due to the modularity, internal redundancy and internal automatic BIST features of the present invention. If a subunit subunits 11–14 is not functioning properly as a result of the test 95, the subunit is removed and reworked at step 96. If required, the removal and rework of a subunit subunits 11–14 takes only one week, thereby minimizing any impact on the satellite integration schedule. The SCE 10 is then integrated into the spacecraft and tested at the spacecraft level (step 97). Spacecraft integration testing 97 takes only ten weeks in accordance with the invention. The total time required for spacecraft electronics manufacturing, integration and testing is only 21 weeks to 22 weeks.

The savings in time using the SCE 10 of the present invention, when compared to the typical test process flow described above with reference to FIG. 6A, is 25 weeks to as much as 30 weeks. Tremendous cost savings are realized when the manufacturing and test cycle times are reduced essentially in half. The present invention provides cost savings while not compromising, but effectively improving, the reliability of the spacecraft. The present invention facilitates meeting present day ambitious schedules of satellite customers.

Thus there has been described a new SCE system 10 for a spacecraft 60 that has multi-functions, such as attitude determination, control, telemetry and command functions and data processing functions integrated together in a single electronics box or unit. The integrated SCE 10 has a built-in self test feature and is physically partitioned into functional subunits, where each subunit is a stand alone plug-in subunit having its own built-in self test features. The built-in self-test features are applied to all levels, from solder joints at the circuit card level to spacecraft harness connections at the spacecraft level. The integrated SCE 10 of the present invention reduces manufacturing, test and spacecraft integration cycle time and cost and improves reliability of the spacecraft 60. It should be understood that the above-described embodiments are merely illustrative of some of the many specific embodiments that represent the principles of the present invention. Clearly, numerous other arrangements can be readily devised by those skilled in the art without departing from the scope of the present invention. For example, it is within the scope of the invention that the integrated SCE 10 can easily use commercial radiation tolerant electronic components throughout with the added advantages of being lower in cost and having long term availability for the spacecraft manufacturer.

What is claimed is:

1. A multi-functional electronic control system for spacecraft comprising:
   a housing;
   a backplane interconnected to the housing, the backplane comprising a serial data bus and external connections to the spacecraft; and
   a plurality of electronic subunits, each of said subunits fitting into the housing and electrically interconnecting to the backplane data bus, wherein one of said subunits includes a central processing subunit for processing data among the plurality of subunits,
   wherein said plurality of electronic subunits provides spacecraft attitude determination, control, telemetry and command and data processing functions to the spacecraft in the single housing.

2. The multi-functional electronic control system of claim 1, further comprising a global positioning system receiver in one of the plurality of subunits, wherein the receiver is in direct communication with the system data processing function and spacecraft antennas for providing spacecraft attitude determination.

3. The multi-functional electronic control system of claim 1, further comprising reaction wheel drivers in one of the plurality of subunits, wherein the reaction wheel drivers are in direct communication with spacecraft reaction wheels for providing spacecraft attitude control.

4. The multi-functional electronic control system of claim 1, further comprising a star camera interface in one of the plurality of subunits, wherein the star camera interface receives and processes spacecraft star camera data in cooperation with the data processing function for providing spacecraft attitude determination.

5. The multi-functional electronic control system of claim 1, further comprising a built-in self test for fault detection in and verification of connectivity of the backplane and of interfaces to the spacecraft that are external to the system.

6. The multi-functional electronic control system of claim 5, wherein said subunits are stand-alone, plug-in modules that are removable and replaceable during spacecraft level integration.

7. The multi-functional electronic control system of claim 1, wherein the backplane data bus comprises a fully redundant serial backplane data bus and at least one of the plurality of subunits comprises internal selective redundancy to the backplane data bus.

8. The multi-functional electronic control system of claim 1, wherein the plurality of subunits each comprises at least one printed wiring board mounted on a rigid frame and plug-in connectors for interconnection to the backplane.

9. The multi-functional electronic control system of claim 1, wherein each of the plurality of subunits comprises a built-in self test to verify the electrical and functional integrity of and detect faults in the subunit.

10. A multi-functional electronic control system for a spacecraft comprising:

a housing;

a backplane interconnected to the housing, the backplane comprising a serial data bus and external connections to the spacecraft;

a plurality of electronic subunits, each of said subunits fitting into the housing and electrically interconnecting to the backplane data bus, wherein said plurality of electronic subunits provides spacecraft attitude determination, control, telemetry and command and data processing function to the spacecraft in the single housing; and a built-in self test for fault detection in and verification of connectivity of the backplane and of interfaces to the spacecraft that are external to the system, the built-in self test verifies end-to-end connectivity of connections between the system and the spacecraft.

11. A multi-functional electronic control system for a spacecraft comprising:

a housing;

a backplane interconnected to the housing the backplane comprising a serial data bus and external connections to the spacecraft; and a plurality of electronic subunits, each of said subunits fitting into the housing and electrically interconnecting to the backplane data bus, wherein said plurality of electronic subunits provides spacecraft attitude determination, control, telemetry and command and data processing functions to the spacecraft in the single housing, wherein the plurality of subunits each comprises at least one printed wiring board mounted on a rigid frame and plug-in connectors for interconnection to be backplane; and wherein the plurality of subunits each comprises two printed wiring boards mounted back-to-back on an aluminum web frame to provide a 2-for-1 internal redundancy to the system.

12. An integrated spacecraft control electronics system having attitude determination, control, telemetry and command and data processing functions in a single unit for a spacecraft comprising:

a housing having a backplane;

a fully redundant serial data bus on the backplane;

a plurality of subunits that fit into the housing and plug into the backplane data bus, wherein the plurality of subunits are in communication with each other via the backplane data bus, the plurality of subunits comprising:

a telemetry and command subunit for communicating with spacecraft transponders and antennas;

a wheel drive subunit for communicating with spacecraft reaction wheels;

an actuator subunit that communicates with spacecraft motors, thrusters and deployment mechanisms; and a central processing subunit for processing data among the subunits and the spacecraft, wherein the system electrically interconnects to the spacecraft via an external connector on the backplane of the housing.

13. The integrated spacecraft control electronics system of claim 12, further comprising an automatic built in self-test feature to test connectivity and detect faults between the system and the spacecraft.

14. The integrated spacecraft control electronics system of claim 12, wherein the telemetry and command subunit comprises:

a telemetry and command application specific integrated circuit;

a global positioning system receiver, wherein each of the integrated circuit and the receiver is independently connected to the backplane data bus;

a built-in internal redundancy; and a built-in self test feature that automatically tests subunit and circuit connectivity and detects faults.

15. The integrated spacecraft control electronics system of claim 12, wherein the wheel drive subunit comprises a plurality of wheel drivers, each having a separate power supply, wherein each of the plurality of wheel drivers are independently connected to the backplane data bus, and a built-in self test feature that automatically tests subunit connectivity and detects faults.

16. The integrated spacecraft control electronics system of claim 15, wherein the wheel drive subunit has four wheel drivers in communication with three spacecraft wheels to provide a 4 for 3 wheel driver redundancy to the spacecraft.

17. The integrated spacecraft control electronics system of claim 12, wherein the actuator subunit comprises an interface application specific integrated circuit, drivers and a built-in self test feature that automatically tests subunit and circuit connectivity and detects faults, wherein the interface integrated circuit is in direct communication with the backplane data bus and the drivers.

18. The integrated spacecraft control electronics system of claim 17, wherein the actuator subunit further comprises a redundant interface application specific integrated circuit to provide redundancy to the backplane data bus and the drivers.

19. The integrated spacecraft control electronics system of claim 12, wherein the central processing subunit comprises a processor, memory, and a built-in self test feature that automatically tests subunit and circuit connectivity and detects faults, wherein the subunit is connected to the backplane data bus and is in communication with the spacecraft through the processor.

20. The integrated spacecraft control electronics system of claim 19, wherein the processor comprises a plurality of microprocessors voted together and a processor support application specific integrated circuit connected to the plurality of microprocessors, wherein the processor support integrated circuit has direct interfaces to the backplane data bus and the spacecraft.

21. A spacecraft having a spacecraft harness with a minimum number of spacecraft harness connections comprising:

a bus section;

a payload section; and a multi-functional spacecraft control electronics unit on the bus section that communicates with the payload section, the control electronics unit comprising:

a housing having a backplane; and a plurality of control electronics subunits that fit in the housing and interconnect to the backplane, wherein the subunits provide spacecraft attitude determination, control, telemetry and command and data processing functions to the spacecraft, wherein one of said subunits includes a central processing subunit for processing data among the plurality of subunits; and interfaces external to the electronics unit, wherein the spacecraft harness is connected to the external interfaces of electronics unit to obtain the functions with a minimum number of harness connections.

22. The spacecraft of claim 21, wherein the control electronics unit further comprises a fully redundant serial backplane data bus that electrically interconnects the subunits in the housing for communication between subunits.

23. The spacecraft of claim 21, wherein each of the plurality of the subunits is modular and comprises circuitry for supporting one or more of the functions, wherein the circuitry is supported by a printed wiring board, a rigid frame for mounting the printed wiring board, and connectors that plug into the housing.

24. The spacecraft of claim 21, wherein the spacecraft control electronics unit further comprises built in self-test functions for independently verifying electrical connectivity of the circuitry, the subunits and external interfaces and for detecting faults.

25. A method of spacecraft integration and test with a minimum number of spacecraft harness connections comprising the steps of:

testing electronic components used in the spacecraft at the component level;

assembling the tested electronic components into electronic subunits, the electronic subunits being modular and providing a plurality of spacecraft control functions;

testing the modular subunits, wherein each of the subunits has an automatic built-in self test capability to test the components, internal circuitry and external interfaces;

electrically interconnecting the subunits to a housing to form a electronic control system, the housing having a backplane, the backplane having a serial data bus for interconnecting the subunits to each other, the electronic control system providing a spacecraft attitude determination, control, telemetry and command and data processing functions to the spacecraft;

testing the electronic control system, wherein the system has an automatic built-in self test capability to further test backplane connectivity;

integrating the electronic control system with the spacecraft through external connectors on the backplane of the housing to provide the spacecraft functions; and testing the integrated spacecraft, wherein the integrated spacecraft has an automatic built-in self test capability to further test backplane external interfaces and harness connections to the spacecraft.

26. The method of claim 25, wherein the step of electrically interconnecting comprises the steps of:

providing mating pairs of connectors in the control system, wherein one mate of the mating pair is positioned on an internal face of the backplane in alignment with the other mate of the mating pair that is positioned on an external face of the subunits; and mating the connectors together as the subunit is inserted into the housing.

27. The method of claim 25, wherein the steps of testing the electronic control system and the integrated spacecraft comprise the steps of;

commanding the subunits into a test mode using a remotely located computer that is interfaced with a high speed serial connection in the electronic control system; and viewing test results from the automatic built-in self test capability at the computer.

* * * * *

UNITED STATES PATENT AND TRADEMARK OFFICE
CERTIFICATE OF CORRECTION

PATENT NO. : 6,298,289 B1
DATED : October 2, 2001
INVENTOR(S) : David W. Lloyd and Bret M. Botzong It is certified that error appears in the above-identified patent and that said Letters Patent is hereby corrected as shown below:

<u>Title page,</u>
Item [73], Assignee, should read:
-- Hughes Electronics Corporation, El Segundo, CA --

Signed and Sealed this

Twenty-fifth Day of February, 2003

JAMES E. ROGAN
*Director of the United States Patent and Trademark Office*